Dec. 5, 1950     A. POSCH     2,532,937
REPLACEABLE HOLDER FOR CASTER SOCKETS
Filed Nov. 20, 1946
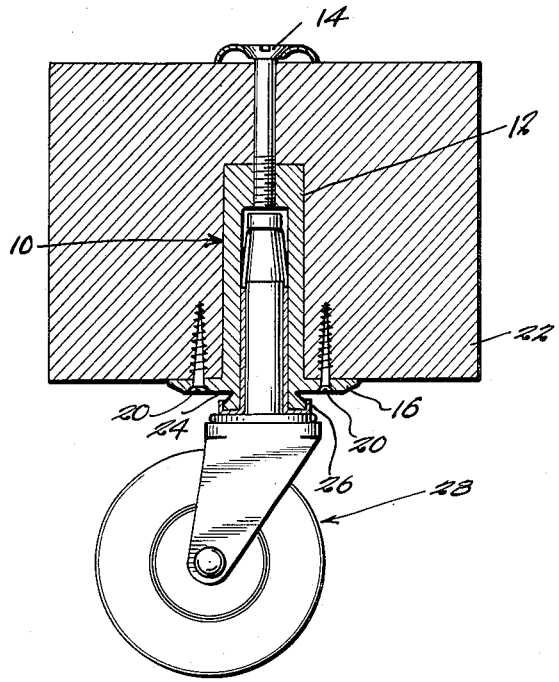
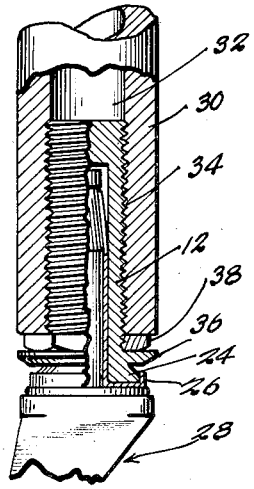
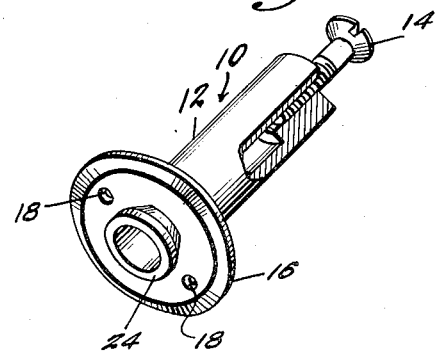
Inventor
AUGUST POSCH
By *Clarence A. O'Brien and Harvey B. Jacobson*
Attorneys Patented Dec. 5, 1950

2,532,937

UNITED STATES PATENT OFFICE 2,532,937

REPLACEABLE HOLDER FOR CASTER SOCKETS

August Posch, Pittsburgh, Pa.

Application November 20, 1946, Serial No. 711,141

1 Claim. (Cl. 16—18)

This invention relates to a novel device for securing a conventional caster in the leg of an article of furniture.

An object of this invention is to provide a replacement holder for casters, adapted to be used in substantially all types of caster requiring furniture.

Another object of this invention is to provide a strong and efficient caster holder which is not likely to break down or fail.

A further object of this invention is to provide a device which is extremely simple, inexpensive and practical and which lends itself well to many environments.

Another object of this invention is to provide a device adapted to be used with a conventional caster and without alteration thereof.

Ancillary objects and features of novelty residing in the present invention shall be pointed out specifically or shall become readily apparent to those skilled in the art, in following the detailed description herewith, of preferred forms of the instant invention, wherein:

Figure 1 is a transverse sectional view of the instant invention showing a preferred embodiment thereof and showing a caster secured therein;

Figure 2 is a sectional transverse view with parts in elevation and showing a modification of the instant invention especially adapted for use with metallic furniture, and Figure 3 is a perspective view with parts broken away in section showing the embodiment of the invention in Figure 1.

Referring now in detail to the preferred embodiment of the instant invention, like reference characters are used to indicate similar parts throughout the views in the drawings.

When furniture is subjected to heavy loads and constant shifting, such as found in office chairs and the like, frequently the bore which houses the caster socket is ruptured and consequently the socket along with the caster drops out of the legs. Accordingly, a device has been developed which is especially adapted to be secured in the bore of a leg to combat this difficulty by forming a substantial and solid holder for the caster sockets. The device may also be used in the manufacture of furniture thereby correcting the caster socket difficulty from the beginning.

Taking now Figures 1 and 3, a body member 10 composed of some suitable material such as iron, steel or the like, is provided having a substantially cylindrical member 12 with a screw threaded aperture at one end thereof. A screw 14 may be secured in the aperture to assist in securing the said member 10 within the caster socket bore for assisting in securing the invention therein. Adjacent the other end of the said cylindrical member 12 is a collar 16 having apertures 18 therein for receiving screw clamping means 20 therethrough. As is obvious from an inspection of Figure 1 the said collar 16 abuts the furniture member 22, and the device is secured in fixed relation with the said furniture member 22 by means of the clamping means 20. Below the said collar 16 is a second collar 24 of annular configuration and having an inclined base thereon, which is adapted to receive the conventional toothed portion 26 of a caster socket.

The operation of this embodiment of the instant invention is now quite apparent. The sleeve member 12 is inserted within the regular caster bore and secured therein by the screw means 20 and the screw means 14. It is here noted that on occasions when the screw 14 cannot be conveniently used it may be eliminated using the screw 20 only. The conventional socket 29 is inserted in the bore of the cylindrical member 12 and the toothed collar 26 is pressed around the annular member 24 of the instant invention.

Referring now to a second embodiment of the instant invention, reference is made to Figure 2. A conventional furniture leg 30 having the usual caster aperture 32 therein, is shown with the present invention applied thereto. The cylindrical member 12 is provided with screw threads 34 adapted to mate appropriate threads within the bore of the said member 30. A collar 36, quite similar to collar 16, is provided adjacent the bottom end of said cylindrical member 12. A lock nut 38 is received between the said collar 36 and the bottom portion of the said leg member 30. The annular caster socket member 26 is pressed around the collar 24 as described in connection with the first embodiment of the instant invention. It is here noted that the present invention has been described as fitting in the bore provided for a conventional caster socket, however, it is apparent that in certain cases the bore within the leg of an item of furniture will probably have to be enlarged by some suitable and conventional means.

Due to the mechanical simplicity of this invention, a further description thereof is deemed unnecessary and it is understood that variations as to size and shape may be made herein without departing from the spirit of the invention. Accordingly, limitations are desired only in accordance with the scope of the following claim.

It is here noted that this invention contemplates the use of various metals and securing means. Considering that this device takes none of the wear it could be welded or otherwise secured, as an integral part of a piece of furniture. The device could be constructed of aluminum for use in aluminum furniture or brass for brass furniture. Obviously, the proper choice of metals should be exercised since similar materials are thermochemically joined more easily than dissimilar materials.

Having thus described this invention what is claimed as new is:

For use in connection with a leg of an article of furniture which has a caster barrel with a ring at one end thereof normally disposed in firm contact with the bottom of the article of furniture leg, a conversion assembly for the caster barrel comprising a sleeve having a bore, an annular flange fixed to one end of said sleeve and adapted to engage the lower end of the leg, said bore having an internal smooth surface wherein the barrel is adapted to be disposed, a second annular flange disposed at the same end of said sleeve as said first-mentioned annular flange, and said second annular flange having an inwardly angled outside surface to receive the barrel ring thereon whereby the ring may be bent in securing relationship with the second annular flange.

AUGUST POSCH.

REFERENCES CITED

The following references are of record in the file of this patent:

UNITED STATES PATENTS

| Number | Name | Date |
| --- | --- | --- |
| 966,788 | Bent | Aug. 9, 1910 |
| 1,503,328 | McAllister | July 29, 1924 |
| 2,416,532 | Nalle | Feb. 25, 1947 |